United States Patent [19]

Munjal et al.

[11] Patent Number: 5,212,281

[45] Date of Patent: May 18, 1993

[54] PROCESS FOR THE PREPARATION OF HIGH MOLECULAR WEIGHT HALOGENATED POLYCARBONATE

[75] Inventors: Sarat Munjal, Lake Jackson, Tex.; Clark J. Cummings, Midland, Mich.; Che-I Kao, Lake Jackson, Tex.

[73] Assignee: The Dow Chemical Company, Midland, Mich.

[21] Appl. No.: 742,140

[22] Filed: Aug. 8, 1991

[51] Int. Cl.⁵ .................................. C08G 64/20
[52] U.S. Cl. .................. 528/202; 252/183.11; 526/61; 528/171; 528/174; 528/196; 528/198; 528/199; 528/200; 528/204; 528/370; 528/371
[58] Field of Search ............ 528/202, 204, 196, 198, 528/199, 200, 171, 174, 370, 371

[56] References Cited

U.S. PATENT DOCUMENTS

| | | |
|---|---|---|
| 3,912,687 | 10/1975 | Haupt et al. . |
| 4,043,980 | 8/1977 | Baron et al. .......................... 528/202 |
| 4,286,085 | 8/1981 | Jaquiss et al. . |
| 4,308,373 | 12/1981 | Mori et al. .......................... 528/202 |
| 4,413,103 | 11/1983 | Katsuhisa et al. ................... 528/202 |
| 4,638,036 | 1/1987 | Mark et al. .......................... 528/202 |
| 4,737,573 | 4/1988 | Silva et al. .......................... 528/371 |
| 4,794,156 | 12/1988 | Ho et al. ............................... 528/199 |
| 4,818,254 | 4/1989 | Anand et al. ........................ 528/202 |

Primary Examiner—Harold D. Anderson
Attorney, Agent, or Firm—John A. Langworthy

[57] ABSTRACT

A process for preparing halogenated polycarbonate wherein the total amount of base, the end pH of the aqueous phase, and the amount of coupling catalyst employed in the reaction are controlled to selected levels.

14 Claims, No Drawings

PROCESS FOR THE PREPARATION OF HIGH MOLECULAR WEIGHT HALOGENATED POLYCARBONATE

FIELD OF THE INVENTION

This invention relates to a process for the preparation of high molecular weight halogenated polycarbonate.

BACKGROUND OF THE INVENTION

Polycarbonate is typically prepared in a heterogeneous reaction mixture which has an aqueous phase and an organic phase. Monitoring pH in the aqueous phase during the polycarbonate-forming reaction is often desirable for the purpose of obtaining a polycarbonate product possessing advantageous characteristics and properties. The pH of the aqueous phase may be adjusted by addition of base to the reaction mixture at one or more times during the progress of the reaction. The pH of the aqueous phase may, for example, be held substantially constant at a selected value by continual additions to the reaction mixture of small, incremental amounts of base. Or, when the addition of base occurs in larger quantities on a limited number of occasions during the process, the natural result of the polycarbonate-forming reaction may be allowed to reduce the pH as the reaction progresses.

When polycarbonate is prepared from a halogenated dihydroxy compound, and the addition of base to the reaction mixture occurs in larger quantities on a limited number of occasions, it is often difficult to accurately control the pH of the reaction mixture as the reaction progresses. It has been found, as an alternative, that the pH of the aqueous phase at the conclusion of the reaction is a useful indicator of whether the polycarbonate product will possess desirable characteristics and properties.

It is therefore a feature of this invention to provide a process for preparing halogenated polycarbonate which allows for control of the pH of the aqueous phase of the reaction mixture at the conclusion of the reaction to a selected level. An advantage of such a process is that halogenated polycarbonate having a desirably high molecular weight may be prepared thereby. It is also a feature of the process of this invention to utilize a coupling catalyst in the reaction mixture in a controlled amount, also for the purpose of obtaining a desirably high molecular weight halogenated polycarbonate.

SUMMARY OF THE INVENTION

In one aspect, this invention involves a process for the preparation of halogenated polycarbonate comprising (a) contacting a halogenated dihydroxy compound, a base, water and a non-reactive organic solvent with a carbonate precursor in a reaction mixture to form halogenated carbonate oligomers; (b) condensing said halogenated carbonate oligomers to form polycarbonate by contacting said oligomers in a tank reactor with (i) further organic solvent; (ii) 50 weight parts per million or less of coupling catalyst, based on the weight of all organic solvent employed in steps (a) and (b), including any in which the coupling catalyst may be dissolved: and (iii) a further amount of base which, together with the amount of base employed in step (a), brings the total moles of base employed in steps (a) and (b) per mole of dihydroxy compound to the number given by $2+4(Y-1)+Q$, where Y is the number of moles of carbonate precursor per mole of dihydroxy compound, and Q is about 0.001 to about 0.2; and (c) recovering a halogenated polycarbonate.

In another aspect, this invention involves a process for the preparation of halogenated polycarbonate comprising (a) contacting a halogenated dihydroxy compound, a base, water and a non-reactive organic solvent with a carbonate precursor in a reaction mixture to form halogenated carbonate oligomers: (b) condensing said halogenated carbonate oligomers to form polycarbonate by contacting said oligomers in a tubular reactor with (i) further organic solvent; (ii) 150 weight parts per million or less of coupling catalyst, based on the weight of all organic solvent employed in steps (a) and (b), including any in which the coupling catalyst may be dissolved; and (iii) a further amount of base which, together with the amount of base employed in step (a), brings the total moles of base employed in steps (a) and (b) per mole of dihydroxy compound to the number given by $2+4(Y-1)+Q$, where Y is the number of moles of carbonate precursor per mole of dihydroxy compound, and Q is about 0.001 to about 0.5: and (c) recovering a halogenated polycarbonate.

By the process of this invention, halogenated polycarbonate compositions are prepared which are useful, for example, for the production of membranes, films, fibers, extruded sheets, multi-layer laminates and molded or shaped articles of virtually every variety, particularly for use in high temperature environments. When softened by the application of heat, the compositions of this invention can be fabricated, formed or molded using conventional techniques such as calendering, vacuum- or thermo-forming, or compression, injection, extrusion or blow molding techniques, alone or in combination. The compositions can also be formed. spun or drawn into films, fibers, multi-layer laminates or extruded sheets, or can be compounded with one or more other organic or inorganic substances, on any machine suitable for such purpose.

DETAILED DESCRIPTION OF THE INVENTION

Halogenated polycarbonate can be prepared from an aromatic dihydroxy compound such as a halogenated diphenol, and a carbonate precursor such as a disubstituted carbonic acid derivative, a haloformate or a carbonate ester. These components are often reacted by means of the phase boundary process in which the dihydroxy compound is dissolved and deprotonated in an aqueous alkaline solution. The aqueous alkaline solution can be formed from a base which may be selected from those including the alkali metal and alkaline earth metal phosphates, bicarbonates, oxides and hydroxides. A preferred base for preparing the aqueous alkaline solution is a caustic soda such as NaOH.

The components can be reacted in a mixture prepared initially from the halogenated dihydroxy compound, water and a non-reactive, organic solvent selected from among those which will dissolve the polycarbonate product but which are immiscible with water. Representative solvents include chlorinated hydrocarbons such as methylene chloride, 1,2-dichloroethane, tetrachloroethane, chlorobenzene, and chloroform, to which tetrahydrofuran, dioxane, nitrobenzene, dimethyl sulfoxide, xylene, cresol or anisole may be added, if desired. Caustic soda or other base is then added to the reaction mixture to adjust the pH of the mixture to a level at which the dianion of the dihydroxy compound is formed. A reducing agent such as sodium sulfite or sodium dithionite can also be advantageously added to the reaction mixture.

A carbonate precursor is contacted with an agitated mixture of the aqueous alkaline solution of the deprotonated halogenated dihydroxy compound, and, for such purpose, the carbonate precursor can be bubbled into the reaction mixture in the form of a gas, or can be dissolved and introduced in solution form. The mixture is agitated in a manner which is sufficient to disperse or suspend droplets of the solvent in the aqueous alkaline solution. Reaction upon contact of the deprotonated halogenated dihydroxy compound with the carbonate precursor at the interface of the organic and aqueous phases created by such agitation yields the bis(carbonate precursor)ester of the dihydroxy compound. For example, if the carbonate precursor is a carbonyl halide such as phosgene, the products of this initial phase of the process can be monomers in dichloroformate form, oligomers which are either mono- or dichloroformates, or bisphenolate ions.

These intermediate carbonates dissolve in the organic solvent as they form, and can then be condensed to a higher molecular weight polycarbonate by contact with a coupling catalyst of which the following are representative: a tertiary amine such as triethyl amine: a hindered secondary amine such as diisopropyl amine; a cyclic aza compound such as 2,2,6,6-tetramethyl piperidine or 1,2-dimethylimidazole; an amidine or aminoamidine compound such as 1-methyl-2phenyliminopyrrolidine; an isourea compound such as N,N-dibutyl-N'-phenyl-o-methylisourea; an iminoether or iminocarboxylate compound such as 1-aza-2-methoxy-1-cycloheptene or t-butyl-cyclohexyliminoacetate; or a phosphonium, sulfonium, arsonium or quaternary ammonium compound.

Activated pyridines which are particularly useful as coupling catalysts in the preparation of halogenated polycarbonates by the process of this invention include either a pyridine or pyridine salt whose catalytic activity is increased by virtue of having a substituent at the 2 or 4 ring position. Suitable 4-aminopyridines for use according to the present invention are 4-dimethylaminopyridine, 4-pyrrolidinopyridine and poly(N,N-dialkylaminopyridine). Examples of suitable 2-substituted pyridines are methylpyridine, ethylpyridine, isopropylpyridine and polyvinyl pyridine. Activated pyridines having additional alkyl groups, such as those represented by the formulae:

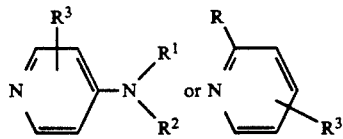

may also be used, where R is a monovalent alkyl radical, a cycloalkyl radical, or a polymer chain such that the formula weight of the catalyst is less than 50,000: $R^1$ and $R^2$ are each independently a monovalent alkyl radical or a polymer chain, such that the formula weight of the catalyst is less than 50,000, or $R^1$ and $R^2$ are $C_1$–$C_8$ alkyl radicals which are joined and, together with N, form a cyclic structure; and $R^3$ is independently hydrogen or a monovalent $C_1$–$C_8$ alkyl radical. A preferred activated pyridine is 4-dimethylaminopyridine.

The molecular weight of a halogenated polycarbonate can be controlled by addition to the reaction mixture of a chain terminator which may be selected from monofunctional substances such as phenols, alcohols, amines, imides, carbonic acid chlorides, sulfonic acid chlorides, or phenylchlorocarbonates. Addition of a chain terminator may be made to the reaction mixture before or after a dihydroxy compound is contacted with a carbonate precursor.

The reaction can be run at a temperature between 0° C.–100° C., although usually not in excess of the boiling point of the solvent used. Frequently, the reaction is run at a temperature of 0° C.–45° C.

Upon completion of polymerization, the organic and aqueous phases are separated to allow purification of the organic phase and recovery of the polycarbonate product therefrom. The organic phase is washed as needed in a centrifuge with dilute base, water and/or dilute acid until free of unreacted monomer, residual process chemicals and/or other electrolytes. Recovery of the polycarbonate product can be effected by spray drying, steam devolatilization, or direct devolitilization in a vented extruder, or precipitation by use of an antisolvent such as toluene, cyclohexane, heptane, methanol, hexanol, or methyl ethyl ketone.

Examples of representative halogenated dihydroxy compounds suitable for the preparation of halogenated aromatic polycarbonate include variously bridged, substituted or unsubstituted aromatic diols (or mixtures thereof) represented by the formula

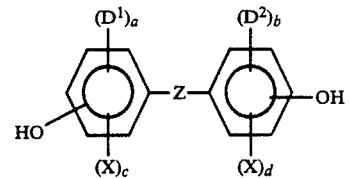

wherein:

(I) Z is (A) a divalent radical, of which all or different portions can be (i) linear, branched, cyclic or bicyclic, (ii) aliphatic or aromatic, and/or (iii) unsaturated, said divalent radical being composed of 1–35 carbon atoms together with up to five oxygen, nitrogen, sulfur, phosphorous and/or halogen (such as fluroine, chlorine and/or bromine) atoms; or (B) S, $S_2$, SO, $SO_2$, O or CO; or (C) a single bond;

(II) each X is independently hydrogen, a $C_1$–$C_{12}$ linear or cyclic alkyl, alkoxy, aryl or aryloxy radical, such as methyl, ethyl, isopropyl, cyclopentyl, cyclohexyl, methoxy, ethoxy, benzyl, tolyl, xylyl, phenoxy and/or xylynoxy;

(III) $D^1$ and $D^2$ are the same or different halo radicals, such as fluoro, chloro, bromo or iodo; and (IV) $0 \geq a \leq 4$ and $0 \geq b \leq 4$, although a and b cannot both equal zero: and $c = 4 - a$ and $d = 4 - b$.

For example, the bridge represented by Z in the above formula can be a carbon atom to which is bonded one or more groups such as $CH_3$, $C_2H_5$, $C_3H_7$, n-$C_3H_7$, i-$C_3H_7$, cyclohexyl, bicyclo[2.2.1]heptyl, benzyl, $CF_2$, $CF_3$ $CCl_3$, $CF_2Cl$, CN, $(CH_2)_2COOCH_3$, or PO(OCH$_3$)$_2$.

Halogenated dihydroxy compounds having a single or joined aryl rings may be employed herein in addition to the dihydroxy compounds described above. Such compounds include, for example, mono- or dihaloresorcinol, or mono- or dihalo,dihydroxynaphthalene, and the like. Particular halogenated dihydroxy compounds useful in the process of this invention include, but are not limited to:

2,2-bis(4-hydroxy-3-bromophenyl)-propane,
2,2-bis(4-hydroxy-3-chlorophenyl)-propane,
bis(4-hydroxy-3-bromophenyl)-methane,
bis(4-hydroxy-3-chlorophenyl)-methane,
bis(4-hydroxy-3-bromophenyl)-sulphone,
bis(4-hydroxy-3-chlorophenyl)-sulphone,
bis(4-hydroxy-3-bromophenyl)-sulphide,
bis(4-hydroxy-3-chlorophenyl)-sulphide,
1,1-bis(4-hydroxy-3-bromophenyl)cyclohexane,
1,1-bis(4-hydroxy-3-chlorophenyl)cyclohexane,
2,2-bis(4-hydroxy-3,5-dibromophenyl)-propane,
2,2-bis(4-hydroxy-3,5-dichlorophenyl)-propane,
bis(4-hydroxy-3,5-dibromophenyl)-methane,
bis(4-hydroxy-3,5-dibromophenyl)-sulphone,
bis(4-hydroxy-3,5-dibromophenyl)-sulphide,
1,1-bis(4-hydroxy-3,5-dichlorophenyl) cyclohexane, and the like.

Halogenated dihydroxy compounds useful herein include, in addition to tetrahalogenated diphenols, statistical mixtures of non-, mono-, di-, tri- and tetrahalogenated diphenols. These statistical mixtures may be prepared, for example, by the halogenation of bisphenols as described in U.S. Pat. No. 4,075,119, which is incorporated herein in its entirety. A preferred tetrahalogenated diphenol is Tetrabromobisphenol-A, 2,2-bis(3,5-dibromo-4-hydroxyphenyl)propane ("TBBA"). A preferred dibrominated diphenol is Dibromobisphenol-A 2,2-bis(4-hydroxy-3-bromophenyl)-propane].

The preferred process of this invention is that in which an aromatic halogenated polycarbonate is prepared. An aromatic halogenated polycarbonate is defined herein with reference to the oxygen atoms, of the one or more dihydroxy compounds present in the polycarbonate chain, which are bonded to a carbonyl carbon. In an aromatic halogenated polycarbonate, all such oxygen atoms are bridged by a dihydroxy compound residue some portion of which is an aromatic ring.

Steps of particular importance in preparing halogenated polycarbonate by the process of this invention involve forming a monomer solution by admixing a halogenated dihydroxy compound, water and an amount of base such that the dihydroxy compound is present in the solution in the form of its dimetal salt. The pH of such a monomer solution is typically about 11.5 to about 13.5, and is preferably about 12.0 to about 12.5. This monomer solution is metered into a reaction vessel where, in an Initial Phase, it is contacted with a nonreactive, immiscible organic solvent and a carbonate precursor, preferably in an amount of about 1.8 to about 2.2 moles of carbonate precursor per mole of dihydroxy compound. Alternatively, base may be metered into the reaction vessel separately rather than in solution with a dihydroxy compound. Although base may be added separately from a dihydroxy compound, the effect of the base will nevertheless be to impart to the reaction mixture a pH at which the dihydroxy compound is present in the solution in the form of its dimetal salt.

Further adjustments to the pH of the mixture formed by these monomers can also be made by the addition of base at one or more points in time as the reaction between the dihydroxy compound and the carbonate precursor proceeds during the Initial Phase. It is preferred, however, that all base which is to become part of the mixture in which the dihydroxy compound and carbonate precursor are reacted in the Initial Phase be added to the reaction mixture on only one occasion.

The vessel in which the dihydroxy compound and carbonate precursor are reacted may be a stirred tank (or series of tanks) or a tube or pipe containing stationary mixing elements. It is preferred that the Initial Phase of the reaction occur in a tubular reactor. Reaction of a dihydroxy compound and carbonate precursor during the Initial Phase yields carbonate oligomers, and, when this occurs without addition of further base after the reaction has commenced, the pH of the aqueous phase drops steadily as the formation of oligomers progresses.

The carbonate oligomers thus formed are then coupled into high molecular weight halogenated polycarbonate during a Subsequent Phase. For this purpose, the solution of oligomers is transferred to a reactor in which they are admixed and agitated with a coupling catalyst, further organic solvent and further base. This reactor can also be a stirred tank (or series of tanks) or a tube or pipe containing motionless mixing elements, or a combination thereof. If coupling is accomplished partly in a tank reactor and partly in a tubular reactor, a portion of the coupling catalyst may be added in each reactor.

To achieve a desirably high molecular weight for the halogenated polycarbonate prepared by the process of this invention, the amount of base employed in the coupling reactor during the Subsequent Phase is controlled to a selected level. The amount of base present with the oligomers, coupling catalyst and solvent in the coupling reactor is the amount which, together with the amount of base employed during the Initial Phase of oligomer formation (as described above), brings the number of moles of base employed in the reaction mixture over the total course of polycarbonate production, per mole of dihydroxy compound, to the number given by $2+4(Y-1)+Q$. Y is the number of moles of carbonate precursor per mole of dihydroxy compound employed in the reaction mixture; and, if the coupling reaction occurs in a tank reactor, Q is about 0.001 to about 0.2, and preferably about 0.01 to about 0.1; and, if the coupling reaction occurs in a tubular reactor, Q is about 0.001 to about 0.5, and preferably about 0.01 to about 0.2.

As a result of controlling the amount of base employed in the process of preparing polycarbonate of this invention, the pH of the aqueous phase of the reaction mixture at the conclusion of the coupling step in the Subsequent Phase is correspondingly controlled to a selected level. If the coupling reaction occurs in a tank reactor, the pH of the aqueous phase after the formation of polycarbonate is complete (the "end pH") is in the range of about 11.0 to about 13.2, and is preferably in the range of about 12.0 to about 12.5. If the coupling reaction occurs in a tubular reactor, the end pH of the aqueous phase is in the range of about 11 to about 13.6, preferably in the range of about 12.0 to about 13.4, and more preferably in the range of about 12.8 to about 13.2.

The amount of coupling catalyst employed in the coupling reaction in the Subsequent Phase is also controlled to a selected level for the purpose of achieving a desirably high molecular weight for the halogenated polycarbonate prepared by the process of this invention. If the coupling reaction occurs in a tank reactor, the amount of coupling catalyst added to the oligomers, solvent and base which are charged to the reactor is 50 weight parts per million ("ppm") or less, is preferably 20 ppm or less, and is more preferably 10 ppm or less, based on the total weight of all the organic solvent having been employed in the reaction mixture during both oligomer formation in the Initial Phase and the coupling step in the Subsequent Phase, including any in which the coupling catalyst may be dissolved. If the coupling reaction occurs in a tubular reactor, the amount of coupling catalyst added to the oligomers, solvent and base which are charged to the reactor is 150 ppm or less, is preferably 100 ppm or less, and is more preferably 50 ppm or less, based on the total weight of the organic solvent, as aforesaid.

Either the Initial Phase of the reaction during which oligomers are formed from a dihydroxy compound and carbonate precursor, or the Subsequent Phase of the reaction wherein oligomers are coupled, or both, may be performed in a reaction vessel in which the inflow of reactants and the outflow of coupled polycarbonate product are continuous and ongoing at the same time. At least some of the reactants enter the vessel at the same time as at least some of the products of the reaction occurring therein are removed from the vessel; preferably the reactants and product enter and leave the reaction vessel at substantially the same rate; and, more preferably, a steady state prevails in which the reactants and product enter and leave the reaction vessel at the same rate and there is no accumulation of material in the reactor.

In the process of this invention, control of the amount of catalyst employed during the coupling step; and control of the pH of the aqueous phase of the reaction mixture at the conclusion of the coupling step, by control of the amount of base employed during the coupling step, yield a halogenated polycarbonate possessing a desirably high molecular weight. The polycarbonate product resulting from the process of this invention has a weight average molecular weight exceeding about 80,000, preferably exceeding about 100,000 and more preferably exceeding about 120,000, and a number average molecular weight exceeding about 20,000, preferably exceeding about 30,000 and more preferably exceeding about 40,000. These measurements can be made by gel permeation or size exclusion chromatography, using a Bisphenol-A polycarbonate standard, or by light scattering methods.

A branched rather than linear halogenated polycarbonate molecule can be obtained by adding to the reaction mixture a tri- or polyfunctional monomer such as a tri- or tetrafunctional phenol or carboxylic acid (or derivative, such as an acyl halide or anhydride), a bisphenol containing carboxylic acid side groups, or a nitrogen-containing compound such as cyanuric chloride, or compounds containing a mixture of such groups. Preferred branching agents are trimellitic acid or pyromellitic dianhydride.

Instead of a halogenated polycarbonate, a halogenated carbonate copolymer (a "copolycarbonate") can be prepared by incorporating into the reaction mixture one or more different dihydroxy compounds, such as compounds which are halogenated in different ways or those which are not halogenated ("non-halogenated"). This can be accomplished by charging the dihydroxy compounds themselves to the reaction mixture either simultaneously or sequentially. If the dihydroxy compounds are added sequentially or added together but have different reactivities toward the carbonate precursor, a segmented or block copolycarbonate will typically result. Different dihydroxy compounds with the same reactivity typically yield a random copolycarbonate when reacted together. Alternatively, if oligocarbonates are formed separately from one or more different dihydroxy compounds, the oligocarbonates can then be coupled in a condensation reaction to yield a segmented or block copolycarbonate. When a dicarboxylic acid (or derivative) or a hydroxycarboxylic acid is used in the reaction mixture, or to form an oligomeric prepolymer, instead of one of the different dihydroxy compounds mentioned above, a poly(ester/carbonate) is obtained instead of a halogenated polycarbonate.

Non-halogenated dihydroxy compounds useful in preparing such a halogenated copolycarbonate are any of the halogenated dihydroxy compounds described above which do not contain any halogen atoms on an aromatic ring which contains a hydroxyl group. Suitable non-halogenated diphenols include, but are not limited to:
bis(4-hydroxyphenyl)-sulphone,
bis(3-hydroxyphenyl)-sulphone,
bis(2-hydroxyphenyl)-sulphone,
bis(4-hydroxyphenyl)methane,
1,1-bis(4-hydroxyphenyl)-propane,
1,1-bis(4-hydroxyphenyl)-butane,
1,1-bis(4-hydroxyphenyl)-heptane,
1,1-bis(4-hydroxyphenyl)-cyclopentane,
1,1-bis(4-hydroxyphenyl)-cyclohexane;
and the like. A preferred non-halogenated aromatic dihydroxy compound is 2,2-bis(4-hydroxyphenyl) propane ("Bisphenol-A").

Halogenated copolycarbonates can also be prepared by reaction of a halogenated diphenol, and optionally one or more other dihydroxy compounds, with a carbonate precursor and, for example, the following: a hydroxy-terminated poly(phenylene oxide) or poly(methyl methacrylate), a phosphonyl dichloride, or an aromatic ester of a phosphonic acid, or by reaction in the presence of a chlorine- or amino-terminated polysiloxane. Siloxane/carbonate block copolymers are discussed in greater detail in Paul, U.S. Pat. No. 4,596,970 and poly(ester/carbonate)s are discussed in greater detail in Swart, U.S. Pat. No.4,105,533, each being incorporated herein in its entirety.

Polycarbonate blends can be prepared by mixing one or more different polycarbonates, and/or one or more different copolycarbonates, and/or one or more other kinds of polymers or copolymers, such as polyethylene, polyester, polyacetal, polyamide, polysulfone, poly(phenylene oxide), acrylonitrile/butadiene/styrene copolymer and/or styrene/maleic anhydride copolymer. The term "polycarbonate" as used herein, and in the claims appended hereto, should therefore be understood to include carbonate homopolymers (those prepared solely from one halogenated dihydroxy compound), carbonate copolymers (as described above), and/or blends of various carbonate homopolymers and/or various carbonate copolymers.

The process of this invention for the preparation of halogenated polycarbonates can further involve compounding with the halogenated polycarbonate product conventional thermoplastic polymer additives which include, but are not limited to, fillers, thermal stabilizers, dyes, flame retarding agents, reinforcing agents, softeners, mold-release agents, pigments, plasticizers, antistatic agents, UV absorbers, lubricants, compatibilizers, and the like, in conventional amounts generally not exceeding 25 percent, and preferably not exceeding 5 percent, by weight of the total composition.

ILLUSTRATIVE EMBODIMENTS

To illustrate the practice of this invention, examples of several preferred embodiments are set forth below. It is not intended, however, that these examples (Examples 1-4) should in any manner restrict the scope of this invention. Some of the particularly desirable features of this invention may be seen by contrasting the characteristics of Examples 1-4 with those of various controlled processes (Controls A and B) which do not possess the features of, and are not therefore embodiments of, this invention.

CONTROLS A AND B; EXAMPLE 1

A monomer solution is prepared by adding 931 grams of 34 wt. % NaOH to 2,011 grams of Tetrabromobisphenol-A ("TBBA"), 8,000 grams of water and 3.13 grams of p-tertbutylphenol ("PTBP"). The monomer solution is contacted with phosgene and methylene chloride solvent in a ⅜-inch-diameter tubular reactor which is fitted three 6-inch-long and one 12-inch-long inline mixers. The monomer solution flow rate is 30 grams/minute, the phosgene flow rate is 2.0 grams/minute, and the methylene chloride flow rate is 36 grams/minute. These components are continuously fed to the tubular reactor and reacted therein for a residence time of two minutes.

The oligomers resulting from this phase of the process are then sent to a continuously stirred tank reactor for coupling where they are contacted with additional methylene chloride. The methylene chloride stream is fed to the tank reactor at a rate of 36 grams/minute, and it contains 2,4-dimethylaminopyridine ("DMAP") as a coupling catalyst in the amount of 75.0 ppm (Control A) and 37.5 ppm (Control B and Example 1). Further 34 wt. % NaOH is also added to the stirred vessel at a rate of 4.5 to 6 grams/minute.

The solution exiting the stirred coupling vessel is completely polymerized as indicated by a negative test for chloroformates using, for example, 4(4-nitrobenzyl)-pyridine, which turns orange in the presence of chloroformates. The organic layer is purified and separated by known methods, and the weight-average and number-average molecular weights of the halogenated polycarbonate product are determined by size exclusion chromatography (using a Bisphenol-A polycarbonate standard). The end pH is determined for the aqueous phase. Those results are all reported in Table I.

EXAMPLES 2 AND 3

A monomer solution is prepared by adding 931 grams of 34 wt. % NaOH to 2,011 grams of TBBA, 8,000 grams of water and 3.13 gram of p-tertbutylphenol. The monomer solution is contacted with phosgene and methylene chloride solvent in a ⅜-inch-diameter tubular reactor which is fitted three 6-inch-long and one 12-inch-long inline mixers. The monomer solution flow rate is 30 grams/minute, the phosgene flow rate is 2.0 grams/minute, and the methylene chloride flow rate is 36 grams/minute. These components are continuously fed to the tubular reactor and reacted therein for a residence time of two minutes.

The oligomers resulting from this process are then coupled by admixing 17.7 grams of methylene chloride with 17.7 grams of the reaction mixture in an 8-ounce glass bottle. 22 grams of 1N NaOH is then added to the bottle followed by 150 ppm DMAP, as a coupling catalyst, (Example 2) and 25 ppm DMAP (Example 3). The glass bottle is then shaken in a mechanical shaker until the end of polymerization, as indicated by a negative test for chloroformates. The organic layer is purified and separated by known methods, and the weight-average and number-average molecular weights of the halogenated polycarbonate product are determined. The end pH is determined for the aqueous phase. Those results are all reported in Table I.

EXAMPLE 4

An aqueous monomer solution is prepared containing 0.26 mole/L of TBBA, 3.3 moles of 50 wt. % NaOH per mole of TBBA, and 5.65 mmoles of PTBP per mole of TBBA. The monomer solution is contacted with phosgene and methylene chloride solvent in a 2-inch-diameter tubular reactor which is fitted three 5-inch-long inline mixers. The monomer solution flow rate is 827 pounds/hour, the phosgene flow rate is 37 pounds/hour, and the methylene chloride flow rate is 740 pounds/hour. These components are continuously fed to the tubular reactor and reacted therein for a residence time of one minute.

The reaction mixture is then flashed in a continuously stirred tank to remove the heat of reaction. Methylene chloride is added to the stirred tank at the rate of 1,022 pounds/hour, DMAP is added at the rate of 0.0141 pounds/hour, and 50 wt. % NaOH is added at the rate of 43 pounds/hour. These components are continuously fed to the tank reactor and reacted therein for a residence time of three minutes. DMAP is added to the reaction mixture as it exits the stirred vessel at the rate of 0.0740 pounds per hour, making a total of 50 ppm DMAP having been added over the course of the reaction. The reaction mixture is then pumped through a 2-inch pipe containing three 5-inch-long static mixers for a residence time of one minute.

The reaction mixture exiting the static mixture is completely polymerized as indicated by a negative test for chloroformates. The organic layer is purified and separated by known methods, and the weight-average and number-average molecular weights of the halogenated polycarbonate product are determined. The end pH is determined for the aqueous phase. Those results are all reported in Table I.

TABLE I

|  | Controls | | Examples | | | |
| --- | --- | --- | --- | --- | --- | --- |
|  | A | B | 1 | 2 | 3 | 4 |
| Catalyst concentration, ppm | 75.0 | 37.5 | 37.5 | 150.0 | 25.0 | 50 |
| End pH of aqueous phase | 12.8 | 13.7 | 13.0 | 13.0 | 13.0 | 12.8 |
| Weight average molecular weight | 40,409 | 63,109 | 141,709 | 123,878 | 167,280 | 200,900 |
| Number average molecular weight | 4,721 | 7,559 | 27,069 | 28,711 | 51,350 | 45,659 |

The data set forth in Table I demonstrate that, in a process for preparation of halogenated polycarbonate, a product having a desirably high molecular weight can be obtained by (i) employing a coupling catalyst in the process in a controlled amount, and (ii) adding base to the reaction mixture during coupling in an amount which, together with the amount of base employed in prior phases of the reaction, imparts to the aqueous phase of the reaction mixture, upon completion of polymerization, a pH within a selected range. For example, in the process of Control A, although the end pH of the aqueous phase of the reaction mixture is a suitably low value, coupling catalyst has been employed at too high a level, and the molecular weight of the resulting product is undesirably low. In Control B, the reverse of those process parameters—an appropriate level of catalyst but too high an end pH—yields the same result as to molecular weight.

However, in the processes of Examples 1-4, which are embodiments of this invention, both catalyst concentration and end pH in the aqueous phase of the reaction mixture are at suitably low levels, and this results in a halogenated polycarbonate product having a desirably high molecular weight.

It is within the skill in the art to practice this invention in numerous modifications and variations in light of the above teachings It is, therefore, to be understood that changes may be made in the various described embodiments of this invention without departing from the spirit and scope of this invention as defined by the appended claims.

What is claimed is:

1. A process for the preparation of halogenated polycarbonate comprising
    (a) contacting a halogenated dihydroxy compound, a base, water and non-reactive organic solvent with a carbonate precursor in a reaction mixture to form a halogenated carbonate oligomer product;
    (b) condensing said halogenated carbonate oligomer product to from polycarbonate product by contacting halogenated carbonate oligomers in a tank reactor with
        (i) further organic solvent;
        (ii) 50 weight parts per million or less of coupling catalyst, based on the weight of all organic solvent present in steps (a) and (b), including any in which the coupling catalyst is dissolved; and
        (iii) a further amount of base which, together with the amount of base present in step (a), brings the total moles of base present in steps (a) and (b) per mole of dihydroxy compound to the number $2+4(Y-1)+Q$, where Y is the number of moles of carbonate precursor per mole of dihydroxy compound, and Q is about 0.001 to about 0.2; and
    (c) recovering a halogenated polycarbonate product.

2. The process of claim 1 wherein step (a), step (b) or both is in a reaction vessel in which at least some of the reactants enter the vessel at the same time as at least some of the products of the reaction occurring therein are removed from the vessel.

3. The process of claim 1 wherein step (a) further comprises admixing a non-halogenated dihydroxy compound with said reaction mixture.

4. The process of claim 1 wherein the halogenated dihydroxy compound is 2,2-bis(3,5-dihalo-4-hydroxyphenyl)propane.

5. The process of claim 1 wherein the coupling catalyst is a 2- or 4-substituted pyridine.

6. The process of claim 1 wherein the halogenated dihydroxy compound is 2,2-bis(3,5-dibromo,4-hydroxyphenyl)propane and the coupling catalyst is 4-dimethylaminopyridine.

7. The process of claim 1 wherein 20 weight parts per million or less of coupling catalyst are employed in step (b).

8. The process of claim 1 wherein the halogenated polycarbonate product recovered in step (c) has a weight average molecular weight of at least about 80,000.

9. The process of claim 1 wherein the halogenated dihydroxy compound is represented by the formula

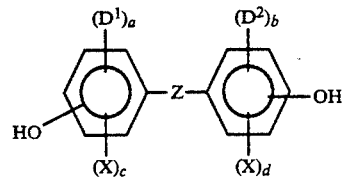

wherein
(I) Z is (A) a divalent radical, of which all of different portions is (i) linear, branched, cyclic or bicyclic, (ii) aliphatic or armomatic, and (iii) saturated or unsaturated, said divalent radical being composed of 1-35 carbon atoms together with up to five atoms selected from the group consisting of oxygen, nitrogen, sulfur, phosphorous and halogen atoms; or (B) S, $S_2$, SO, $SO_2$, O or CO; or (C) Z is a single bond;
(II) each X is independently hydrogen, a $C_1$-$C_{12}$ linear or cyclic alkyl, alkoxy, aryl or aryloxy radical;
(III) $D^1$ and $D^2$ are the same or different halo radicals;
(IV) $0 \geq a \leq 4$ and $0 \geq b \leq 4$, provided that if $a=0$, $b=1, 2, 3$ or 4, and if $b=0$, $a=1, 2, 3$ or 4; and
(V) $c=4-a$ and $d=4-b$.

10. The process of claim 1 wherein Q is about 0.01 to about 0.01.

11. The process of claim 1 wherein the amount of catalyst in step (b) is 10 weight parts per million or less.

12. The process of claim 1 wherein the halogenated polycarbonate product recovered in step (c) has a weight average molecular weight of at least about 100,000.

13. The process of claim 1 wherein the halogenated polycarbonate product recovered in step (c) has a weight average molecular weight of at least about 120,000.

14. The process of claim 3 wherein the non-halogenated dihydroxy compound is 2,2-bis(4-hydroxyphenyl)propane.

* * * * *